(12) United States Patent  (10) Patent No.: US 8,560,002 B1
Narendran et al.  (45) Date of Patent: Oct. 15, 2013

(54) USE OF REVERSE TRANSMISSION POWER HISTORY AS BASIS TO VARY FREQUENCY OF ENGAGING IN BACKGROUND COMMUNICATIONS

(75) Inventors: Rajveen Narendran, Olathe, KS (US); Muralidhar Malreddy, Overland Park, KS (US); Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 238 days.

(21) Appl. No.: 13/101,720

(22) Filed: May 5, 2011

(51) Int. Cl.
*H04B 7/00* (2006.01)

(52) U.S. Cl.
USPC ........................................................ 455/522

(58) Field of Classification Search
USPC ........................................................ 455/522
See application file for complete search history.

(56) References Cited

U.S. PATENT DOCUMENTS

| | | | |
|---|---|---|---|
| 5,754,959 A | 5/1998 | Ueno et al. | |
| 5,794,140 A | 8/1998 | Sawyer | |
| 6,014,694 A | 1/2000 | Aharoni et al. | |
| 6,078,568 A | 6/2000 | Wright et al. | |
| 6,078,957 A | 6/2000 | Adelman et al. | |
| 6,108,542 A | 8/2000 | Swanchara et al. | |
| 6,393,285 B1 | 5/2002 | Stephens | |
| 6,681,256 B1 | 1/2004 | Kuntze et al. | |
| 6,819,926 B2 | 11/2004 | Karlsson et al. | |
| 7,213,065 B2 | 5/2007 | Watt | |
| 7,609,171 B2* | 10/2009 | Haapoja et al. | 340/870.39 |
| 7,634,558 B1 | 12/2009 | Mangal et al. | |
| 8,095,642 B1 | 1/2012 | Martin et al. | |
| 8,180,407 B1 | 5/2012 | Kindred et al. | |
| 2002/0090945 A1 | 7/2002 | Sasada | |
| 2002/0102974 A1* | 8/2002 | Raith | 455/434 |
| 2002/0152432 A1 | 10/2002 | Fleming | |
| 2002/0152446 A1 | 10/2002 | Fleming | |
| 2004/0116161 A1* | 6/2004 | Grivas et al. | 455/574 |
| 2004/0230661 A1 | 11/2004 | Rashid et al. | |
| 2004/0243702 A1 | 12/2004 | Vainio et al. | |
| 2004/0252669 A1 | 12/2004 | Hosein | |
| 2005/0009534 A1 | 1/2005 | Harris et al. | |
| 2005/0048960 A1* | 3/2005 | Yamauchi et al. | 455/418 |
| 2005/0081073 A1* | 4/2005 | Williams | 713/320 |
| 2005/0208960 A1* | 9/2005 | Hassan | 455/522 |
| 2006/0148418 A1* | 7/2006 | Purkayastha et al. | 455/73 |
| 2007/0184863 A1* | 8/2007 | Takagi et al. | 455/507 |
| 2008/0161072 A1 | 7/2008 | Lide et al. | |
| 2009/0195350 A1* | 8/2009 | Tsern et al. | 340/3.1 |
| 2010/0020781 A1 | 1/2010 | Tayloe et al. | |
| 2011/0045824 A1 | 2/2011 | Bischof et al. | |
| 2012/0021800 A1* | 1/2012 | Wilson et al. | 455/550.1 |
| 2012/0184287 A1* | 7/2012 | Jovicic et al. | 455/456.1 |

OTHER PUBLICATIONS

M. Handley, et al., "SIP: Session Initiation Protocol," Network Working Group, Request for Comments: 2543, first page, Mar. 1999.

(Continued)

*Primary Examiner* — Nathan Mitchell

(57) ABSTRACT

Disclosed is a method and corresponding wireless communication device (WCD) arranged to control how often the device engages in background communication. For example, the WCD may programmatically evaluate a history of transmission power that it has used for transmitting to a serving radio access network. Based on that history of transmission power, the device may then determine how often it should engage in background communications and may set itself to engage in background communications at that determined frequency.

23 Claims, 3 Drawing Sheets

(56) References Cited

OTHER PUBLICATIONS

S. Donovan, et al., "Session Initiation Protocol Extension for Session Timer," Internet Engineering Task Force, Internet Draft, Jul. 1, 2002.
U.S. Appl. No. 11/038,944, filed Jan. 18, 2005.
Office action from U.S. Appl. No. 11/038,944, dated Jul. 27, 2007.
Office action from U.S. Appl. No. 11/038,944, dated Jan. 14, 2008.
Office action from U.S. Appl. No. 11/038,944, dated Apr. 17, 2008.
Office action from U.S. Appl. No. 11/038,944, dated Dec. 19, 2008.
Office action from U.S. Appl. No. 11/038,944, dated Jun. 18, 2009.
Office action from U.S. Appl. No. 11/038,944, dated Oct. 16, 2009.
Office action from U.S. Appl. No. 11/038,944, dated Apr. 26, 2010.
Office action from U.S. Appl. No. 11/038,944, dated Oct. 1, 2010.
Advisory action from U.S. Appl. No. 11/038,944, dated Jul. 23, 2010.
Notice of allowance from U.S. Appl. No. 11/038,944, dated Mar. 9, 2011.
Notice of allowance from U.S. Appl. No. 11/038,944, dated Jun. 17, 2011.

\* cited by examiner

USE OF REVERSE TRANSMISSION POWER HISTORY AS BASIS TO VARY FREQUENCY OF ENGAGING IN BACKGROUND COMMUNICATIONS

BACKGROUND

One of the biggest issues with today's smart phones and other types of portable wireless communication devices is battery consumption. This problem becomes exacerbated as applications running on a wireless device regularly cause the device to engage in background wireless communications, such as automatic communications to synchronize e-mail, calendar, weather, gaming, and other data with network servers for instance. Each time a device engages in such communication, the device may need to wake up from an idle state, work with a serving radio access network to acquire a radio link through which to exchange bearer traffic, transmit and receive data over that link, and then tear down the link, all of which consumes limited battery power. Particularly as multiple applications do this, a device can readily lose battery power, thereby inconveniencing the device user.

OVERVIEW

Disclosed herein is a method and corresponding wireless communication device (WCD) arranged to control how often the device engages in background communications with a serving radio access network (RAN), and thus defining how long (e.g., at a minimum) the device will wait after engaging in a background communication before engaging in a next background communication.

The method stems from a recognition that another factor contributing to wireless device battery consumption is the power level at which the device engages in wireless transmissions. If the device tends to transmit at a relatively high power level, the device may consume battery power more quickly, and vice versa. Advantageously, the method helps to draw a balance with respect to background communications, by having the device control its frequency of background communications based on the power level at which the device has recently engaged in wireless transmissions.

In an example implementation, the device will programmatically evaluate a history of transmission power that it has used for transmitting to the RAN. Based on that history of transmission power, the device will then determine how often it should engage in background communications with the RAN and will set itself to engage in background communications at that determined frequency. For instance, if the device has tended to use relatively high transmission power for transmitting to the RAN, then the device may programmatically decide to engage in less frequent background communications, and if the device has tended to use relatively low transmission power for transmitting to the RAN, then the device may programmatically decide to engage in more frequent background communications.

The method is particularly useful in a system where the transmission power of the device varies over time, such as where the device engages in a power control process to adjust its transmission power while actively engaged in communications with the RAN. In such a power control process, the device may increase or decrease its transmission power based on the strength of communications that the device is receiving from the RAN. Alternatively or additionally, the device may receive regular power control commands from the RAN instructing the device to increase or decrease transmission power based on the RAN's evaluation of signal strength received from the device. In any event, the power level of the device's transmissions to the RAN may thus vary from time to time.

In accordance with the method, the device may keep track of its transmission power history and, based on that transmission power history, may set or adjust how often the device engages in background communications with the RAN. For instance, the device may determine or establish a representative measure of its recent transmission power level, such as an average, maximum, or latest, and the device may correlate that representative measure with a frequency or wait-time between background communications. The device may then apply that determined frequency or wait time in practice, to control how often the device engages in background communications. Note that in this process, the issue is how often the device will engage in background communications, regardless of the data transmission rate at which the device carries out any given one of the background communications.

In practice, background communications by the device may be invoked by an application (e.g., an e-mail application) running on a host processor of the device, while wireless transmission power of the device may be managed by a wireless communication module in the device such as a mobile station modem (MSM) chipset for instance. To implement the method, the host processor may thus be arranged to communicate with the wireless communication module so as to determine device's transmission power history and to use the determined transmission power history as a basis to set how often to invoke background communications. Other arrangements for implementing the method may be possible as well.

Furthermore, the most relevant transmission power history of the device may be the transmission power used recently by the device in substantially the same location where the device is going to engage in background communications, as such transmission power history may be representative of the power at which the device is likely to transmit background communications.

In practice, if the device is in a vehicle that is moving relatively quickly or the device is in some other manner moving rather quickly, the recent transmission power used by the device may become less relevant, as the device may quickly move into a new area where transmission power is likely to be quite different. Accordingly, in a further respect, the method may take into consideration the speed of movement of the device (e.g., a vehicle in which the device is embedded or otherwise positioned) and may use the speed as a basis to weight transmission power history. For instance, if the device is moving rather quickly, the device may give less weight to its transmission power history, whereas if the device is moving rather slowly or is stationary, the device may give more weight to its transmission power history.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to explain and illustrate the invention by way of example only.

DETAILED DESCRIPTION

Figure 1:
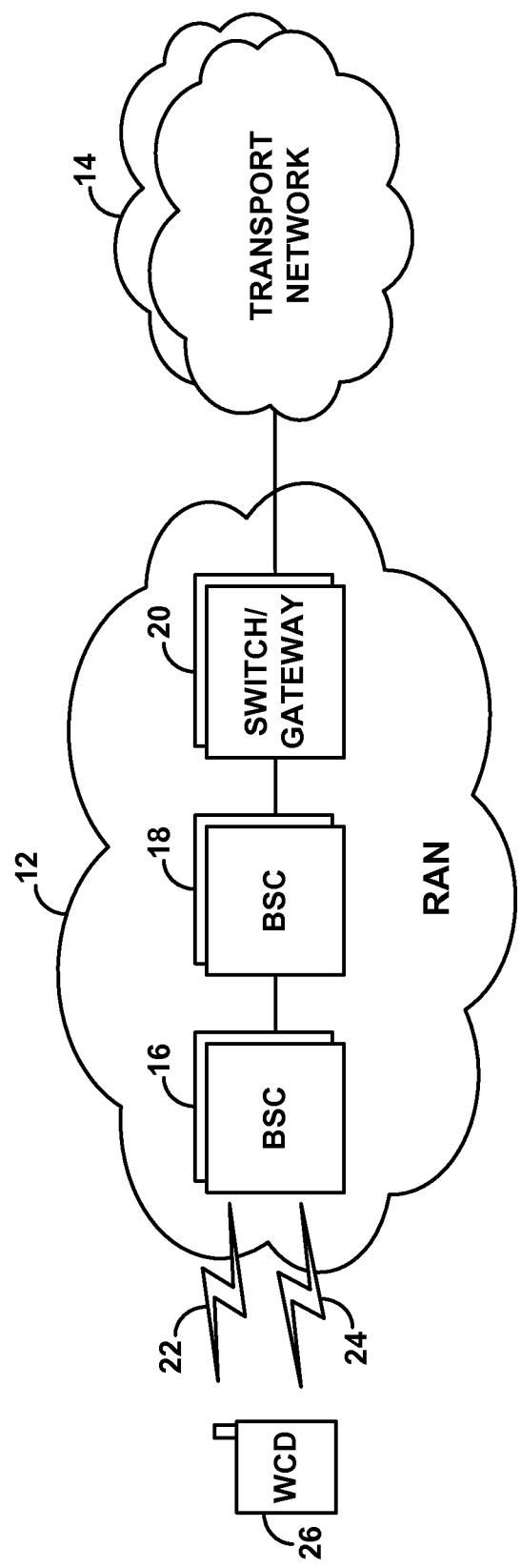
FIG. 1 is a simplified block diagram of an example wireless communication system in which the present method can be implemented.

Referring to the drawings, as noted above, FIG. 1 is a simplified block diagram of an example wireless communication system in which the present method can be implemented. The system includes at its core a RAN 12 that functions to provide served WCDs with communication service, such as access to one or more transport networks 14 for instance. As shown, the example RAN 12 includes one or more base stations (BSs) 16, one or more base station controllers (BSCs) 18, and one or more switches/gateways 20 providing connectivity with the transport network(s) 14. A suitable RAN can take other forms as well, ranging in degree of complexity and scope of operation.

Each base station preferably includes one or more antenna arrangements and associated equipment for radiating to define one or more wireless coverage areas (such as cell sectors), in which WCDs may operate. FIG. 1 depicts representative coverage areas 22, 24. These coverage areas may emanate from a common base station or from separate base stations, and the coverage areas preferably overlap with each other to facilitate handoff from one coverage area to another.

Further, shown operating in coverage of the RAN is an example WCD 26. WCD 26 may be a cellular telephone, wirelessly equipped tablet, personal digital assistant or personal computer, embedded wireless device, wireless tracking device, or other wirelessly equipped device of a type now known or later developed.

Air interface communications between the WCD and the RAN may comply with an agreed air interface protocol, examples of which include CDMA (e.g., 1xRTT or 1xEV-DO), iDEN, WiMAX, LTE, GSM, HSDPA, and others now known or later developed. Communications in the direction from the RAN to the WCD define a "forward link", while those in the direction from the WCD to the RAN define a "reverse link".

In each coverage area, the RAN may implement one or more frequency channels each defined by at least one carrier frequency. For instance, each frequency channel may define a forward link frequency and a corresponding reverse link frequency. Further, the air interface may be divided into particular communication channels through a mechanism such as time division multiplexing, code division multiplexing, and/or frequency division multiplexing, for instance.

By way of example, the forward link may define a pilot channel on which the RAN broadcasts a pilot signal for use by WCDs to detect and evaluate coverage (with each pilot signal including or embodying an identifier of the coverage area), a paging channel on which the RAN may page WCDs, one or more traffic channels on which the RAN transmits bearer data to WCDs that are actively engaged in communication sessions (e.g., voice calls or packet-data communications), and a power control channel on which the RAN transmits power control commands to active WCDs. The reverse link, on the other hand, may define an access channel on which WCDs may send requests to acquire radio links, and one or more traffic channels on which WCDs may transmit bearer traffic to the RAN. Other channels, or variations from these channels, may be defined as well or instead.

When a WCD is positioned within a given coverage area and does not currently have an assigned air interface traffic channel on which to transmit bearer data to the RAN, the WCD is considered to be "idle" or "dormant". In that mode, if the WCD seeks to initiate a communication session, whether automatically or in response to a user or network request, the WCD may then transmit a connection initiation request via an air interface access channel to the RAN. Upon receipt of this request, the RAN may then assign traffic channel resources for the call and send a channel assignment message or the like to the WCD to direct the WCD to proceed with the communication session using the assigned resources. At that point, the WCD is considered to be "active."

In the active mode, as noted above, a WCD may engage in a power control process to control the power at which it transmits communications to the RAN. This power control process may take various forms.

By way of example, as the WCD transmits bearer data to the RAN, the RAN may receive the data and may regularly measure a signal strength (e.g., signal to noise ratio) of the received signal and compare the signal strength to a power control setpoint that is deemed appropriate to facilitate quality reception by the RAN. If the signal strength is less than the setpoint, then RAN may then transmit a power-up command to the WCD, and the WCD may receive the command and responsively increment its reverse transmission power. Whereas, if the signal strength is greater than the setpoint, then the RAN may transmit a power-down command to the WCD, and the WCD may receive the command and responsively decrement its reverse transmission power.

In practice, the RAN may continually transmit a sequence of these power control commands to the WCD, and the WCD may thus continually receive the power control commands and respond to each by accordingly incrementing or decrementing its reverse link transmission power. Optimally, this process may help maintain the WCD's transmission power at a level that will allow the RAN to receive the WCD's transmissions at about the setpoint level.

As another example, the WCD may continually monitor forward link receive signal strength (e.g., signal to noise ratio) and may adjust its reverse link transmission power based on the forward link receive level. The theory here is that if the air interface is particularly noisy and the forward link receive level is therefore especially low, the reverse link may also be noisy, and so it may make sense to increase reverse link transmission power. Conversely, if the air interface is particularly clear and the forward link receive level is especially high, then the reverse link may also be clear, and so it may make sense to decrease reverse link transmission power.

The WCD may engage in these and/or other power control processes to adjust its transmission power as the WCD engages in communications to the RAN. Thus, the WCD's transmission power may vary from time to time.

As noted above, the present method leverages the WCD's transmission power history as a basis to establish how often the WCD should engage in background communications with the RAN. For this purpose, background communications may be any communication transactions that the wireless device invokes automatically and thus without requiring user request or approval at the time, even if a user had set up the device in advance to engage in such communications. Representative background communications are communications carried out periodically by one or more applications on the WCD to synchronize data with one or more network servers, such as to synchronize e-mail, calendar, weather, news, gaming, content-catalogs, presence, and/or other data for instance. On the other hand, foreground communications may be communications that the device carries out in response to user request or approval at the time, such as where a user interacts with a browser or other application on the device to direct the device to download particular content at the time, and the device responsively does so.

Figure 2:
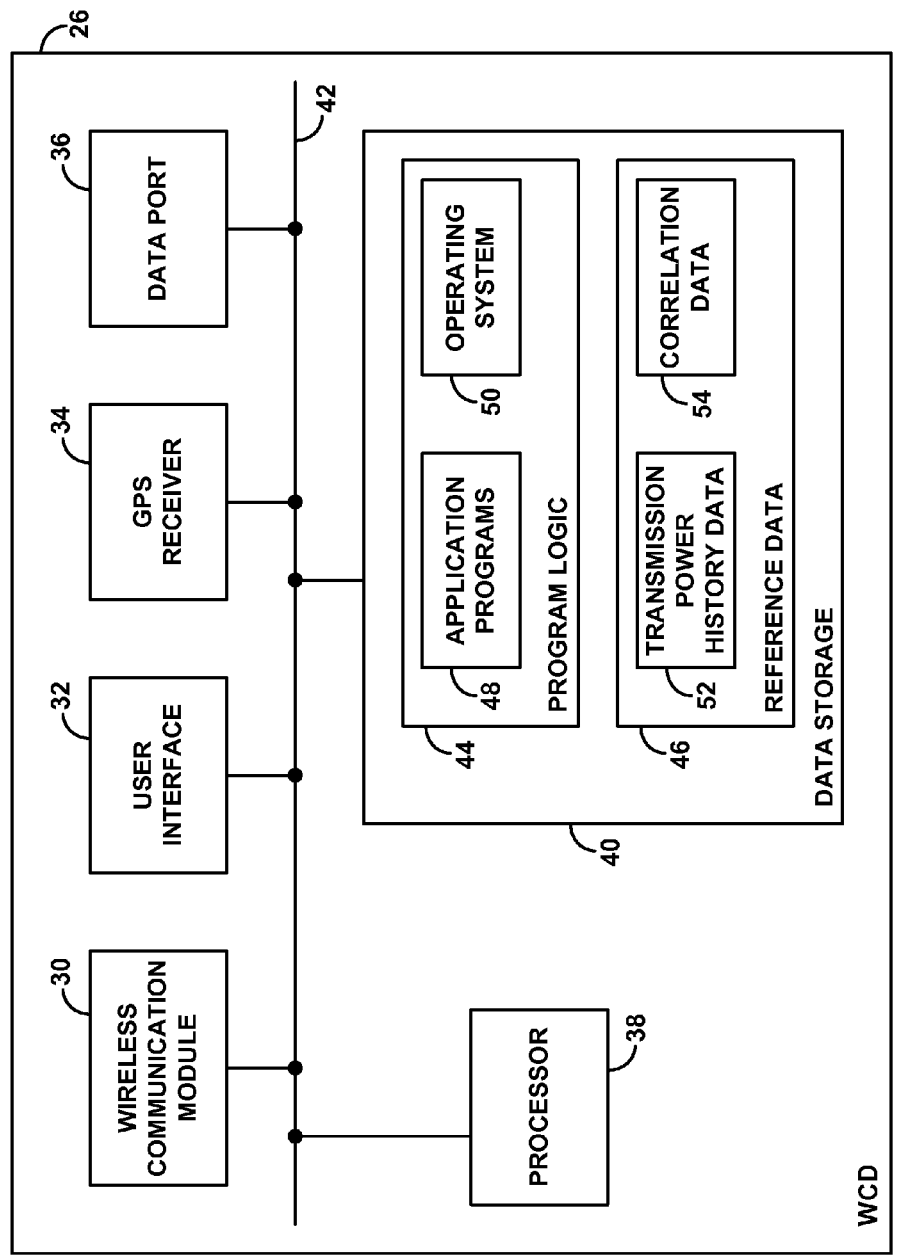
FIG. 2 is a simplified block diagram of a WCD arranged to implement the present method.

FIG. 2 is a simplified block diagram of an example WCD 26, showing some of the functional components that can be included in such a device to carry out the present method. As shown, the example WCD includes a wireless communication module 30, a user interface 32, a GPS receiver 34, a data port 36, a processor 38, and data storage 40, all of which may be communicatively linked together by a system bus or other connection mechanism 42. Although these components are shown as discrete elements in the block diagram, they may be combined or functionally integrated in various ways. For example, the processor and data storage may be elements of the wireless communication interface (e.g., on a wireless communication chipset). Other examples are possible as well.

Wireless communication module 30 functions to facilitate air interface communication with the RAN according to an agreed air interface protocol, such as one of those noted above for instance, and may thus comprise a wireless communication chipset and an associated antenna structure. The wireless communication module preferably includes a variable power amplifier, to facilitate wireless transmission at varying power levels, and the wireless communication module may be arranged to carry out a power control process such as one of those noted above for instance. Further, the wireless communication module may be arranged to record internally and/or report measures of transmission power used by the wireless communication module over time, to facilitate use of that transmission power history as a basis to establish how often the device should engage in background communications.

User interface 32, in turn, functions to facilitate interaction with a user of the WCD (if applicable) and may thus comprise input and output components such as a keypad, display, speaker, and the like.

GPS receiver functions 34 to receive GPS signals to enable the WCD to determine its location (possibly by itself or through interaction with RAN 12), for use in possibly evaluating the speed of movement of the WCD, and may be integrated in whole or in part with the wireless communication module 30. And data port 36 may comprise a port (e.g., micro-USB or other standard or specialized connection) through which the WCD is arranged to exchange data with locally connected devices, such as with a vehicle or other device in which the WCD is embedded or otherwise set to be used.

Processor 38 may comprise one or more general purpose processors (e.g., INTEL processors) and/or one or more special purpose processors (e.g., digital signal processors and/or application specific integrated circuits). And data storage 40 may comprise one or more volatile and/or non-volatile storage components such as magnetic, optical, solid-state (e.g., flash), organic, or other storage mechanisms.

As shown, data storage 40 may contain program logic 44 and reference data 46. The program logic 44 may comprise application programs 48 and an operating system 50, both executable by processor 38 to carry out various WCD functions described herein.

In an example implementation, the application programs 48 may be arranged to carry out various useful functions and to engage in communications, via wireless communication module 30 and RAN 12, with one or more network servers or other entities. As noted above, such application programs may be set to periodically engage in background communications, such as communications to synchronize e-mail, calendar, weather, news, gaming, presence, or other data for instance, and the application programs themselves or other logic on the device may be arranged to set or adjust the frequency of those background communications based on the transmission power history of the device.

The operating system 50 may interface between the application programs 48 and the wireless communication module 30, to facilitate exchange of data between those components, such as exchange of bearer traffic being wirelessly communicated by wireless communication module 30, and reporting of transmission power level data from the wireless communication module 30 to the application programs or other device logic.

For instance the operating system 50 may provide an application program interface (API) usable by the application programs 48 to obtain transmission power history from the wireless communication module 30. In practice, when the operating system receives a defined API call from an application program, the operating system may then request and receive transmission power history data from the wireless communication module and may return the transmission power history data to the calling application program. Through this process, application-layer logic on the WCD can discover the WCD's transmission power history and can then use that information as a basis to automatically adjust or set how often the WCD should engage in background communications.

Operating system 50 may also interface between the application programs 48 and the GPS receiver 34 and/or data port 36. Thus, through a defined API for instance, application programs on the device may be able to query the GPS receiver to determine location of the device over time, and to thereby determine the speed of movement of the device. Likewise, through a defined API, application programs on the device may be able query a connected device to obtain pertinent data. For instance, the application programs may be able to query the diagnostics system of a vehicle in which the device is embedded or otherwise positioned, to determine a speed at which the vehicle is moving and thus a speed at which the WCD is moving. As noted above, this speed data could be used in practice to weigh transmission power history data, in terms of relevance to the decision of how often the device should engage in background communications.

Reference data 46, in turn, may comprise various data collected by the device or useable by the device in normal practice or when carrying out the present method. By way of example, in one implementation, the reference data may comprise transmission power history data 52 reported by the wireless communication module autonomously or in response to queries from various application logic. As another example, the reference data may comprise correlation data 54 that maps various transmission power levels with respective frequencies of background communication. Thus, in practice, application logic on the device may query the correlation data 54 to determine how often to invoke background communications, based on a measure of transmission power history determined from the wireless communication module 30, and the application logic may apply, and/or cause other application logic on the device to apply, that determined frequency.

Figure 3:
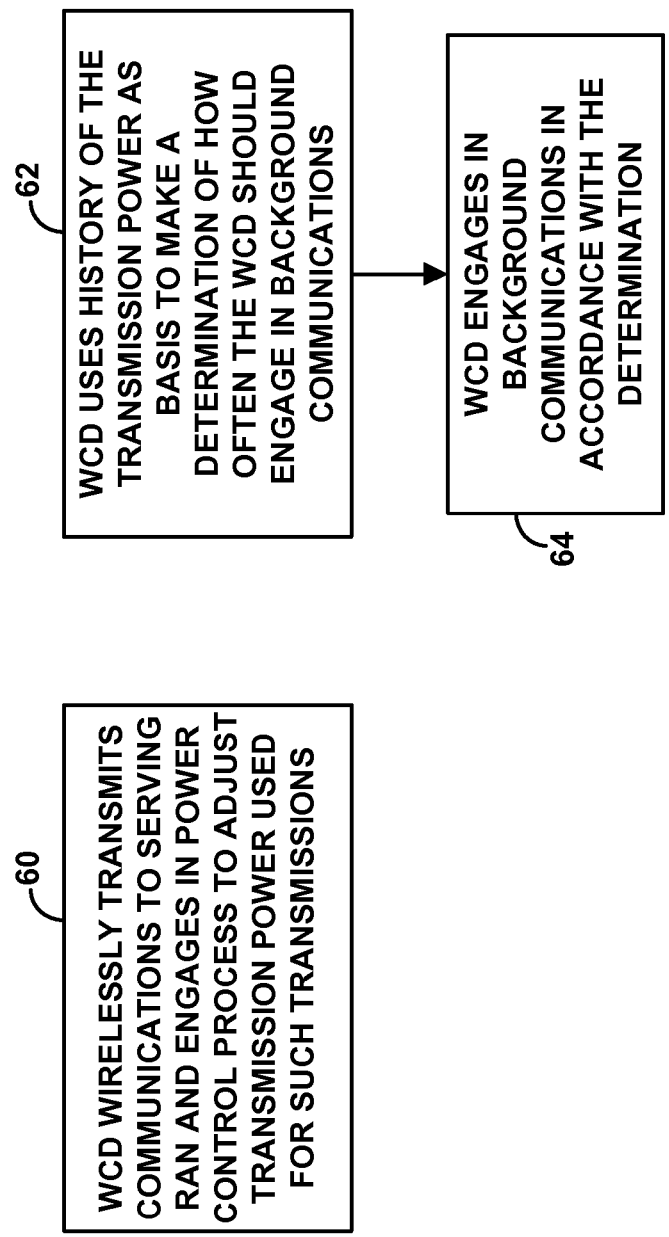
FIG. 3 is a flow chart depicting functions that can be carried out in accordance with the present method.

FIG. 3 is next a flow chart depicting functions that can be carried out by WCD 26 in accordance with an exemplary embodiment of the present method.

As shown in FIG. 3, at block 60, the WCD wirelessly transmits communications to a serving RAN 12 and engages in a power control process to adjust transmission power used by the WCD for such transmissions. In practice, the these communications may be foreground and/or background traffic communications that occur when the device is in an active state. During the course of such communications, as noted above, the WCD may engage in a power control process, such as to regularly adjust its reverse link transmission power in response to power control commands received from the RAN or based on an evaluation of received signal strength on the forward link.

At block 62, which as shown may occur in parallel with block 60, the WCD uses a history of its transmission power as a basis to make a determination of how often the WCD should engage in background communications with the RAN (e.g., background communications via the RAN). In practice, this function may be carried out by the application program that will engage in the background communications. Alternatively, this function may be carried out by other application logic on the device, or in some other manner.

The function of the WCD making the determination of how often to engage in background communications may involve the WCD determining a representative measure of transmission power history and then deciding based on that representative measure how often to engage in background communications.

As noted above, for instance, application logic carrying out this function may place an API call to obtain transmission power history data from the wireless communication module 30. Alternatively, if the data has been stored in data storage 40, the application logic may simply read the data from there.

The transmission power history data may comprise a series of transmission power levels used by the WCD and perhaps a time-stamp for each to indicate when the transmission power level was used. Determining the representative measure of transmission power history may involve averaging a certain extent of such transmission history data, taking the latest measure as a most relevant measure, taking a maximum measure, or performing some other manipulation or evaluation of the transmission power history data. Alternatively, the transmission power history data itself may comprise the representative measure, in which case determining the representative measure may involve querying the data to obtain the measure.

As further noted above, to help focus on more relevant transmission power history data, the WCD may use its speed of movement (if any) as a basis to weigh the transmission power history data. By way of example, the WCD may determine its speed of movement by reference to GPS receiver or an linked vehicle diagnostics system or other mechanism, and the WCD may then use that speed of movement as a basis to filter or adjust the transmission power history data. For instance, if the WCD is moving rather quickly, the WCD may programmatically opt to consider only its one latest transmission power level rather than an average of several recent transmission power levels, or the WCD may give greatest weight to its most recent transmission power level and progressively less weight to its transmission power levels the older they are. Further, the WCD may take into consideration its speed of movement at the time of and in between the various recorded transmission power levels, to determine the relevance of the various power levels.

Still further, the WCD may track its distance of movement from where it was located when it used a particular transmission power and may use that transmission power as a basis to determine how often to engage in background communications, provided that the location of the transmission power level is not more than a defined threshold from where the WCD is currently located. Other uses of speed and location data are possible as well, to help tailor operation of the method.

In practice, the WCD may have correlation data 54 that maps transmission power levels with frequencies of background communication. To make the determination of how often to engage in background communication based on a given measure of transmission power history, the WCD may thus refer to that correlation data to determine the frequency of background communication indicated for the determined measure of transmission power history.

The result of this decision may be inversely proportional to the representative measure, such that if the representative measure is relatively low, the decision would be to engage in background communications relatively more often, and if the representative measure is relatively high, the decision would be to engage in background communications relatively less often. Further, the result may be an indication of how long the device should wait after a given background communication before engaging in a next background communication. This wait-period may be a minimum, in the sense that the device could wait longer if some other factor justifies doing so.

In exemplary operation, the WCD will autonomously make the determination of how often to engage in background communications without basing the determination on any wireless coverage area load information from the RAN. Optimally, the method thus enables the WCD to adjust how often it engages in background communications without the need to receive such load information from the RAN, and thus without the RAN needing to provide the information to the WCD for that purpose.

Furthermore, as noted above, the WCD determination of how often to engage in background communications may be made without regard to the data transmission rate used by the WCD for particular communications.

Continuing with reference to FIG. 3, at block 64, after the WCD has made the determination of how often to engage in background communications, the WCD will then engage in background communications in accordance with that determination. In practice, for instance, the WCD may set one or more of its application programs to invoke background communications no more frequently than that determined. Or more simply, the WCD may set and apply a timer after a given background communication to indicate how long to wait before engaging in a next background communication.

Optimally, this process may continue regularly as the WCD runs applications that engage in background communications. The process can be carried out by an add-on module, such as a stand-alone application that is arranged to help conserve WCD battery power and that interacts with various device applications that invoke background communications. Such an application could, in one implementation, operate as an intermediary logical block between an application program and the operating system, such as to throttle background communications in accordance with the determination of how often such communications should occur. Or the process could be carried out by the operating system itself or other logic.

An exemplary embodiments has been described above. It should be understood, however, that variations from the embodiments discussed are possible, while remaining within the true spirit and scope of the invention as claimed.

We claim:

1. A method comprising:
 a wireless communication device (WCD) wirelessly transmitting communications to a serving radio access network (RAN) and engaging in a power control process to adjust transmission power used by the WCD for the transmitting;
 based on a history of the transmission power used by the WCD for the transmitting and based on speed of movement of the WCD, the WCD making a determination of how often the WCD should engage in background communications with the RAN; and the WCD engaging in background communications with the RAN in accordance with the determination.

2. The method of claim 1, wherein making the determination based on the history of transmission power comprises:
   determining a representative measure of transmission power history; and
   deciding how often based on the representative measure.

3. The method of claim 2, wherein the decision of how often is inversely proportional to the representative measure.

4. The method of claim 3, wherein the representative measure is an average.

5. The method of claim 3, wherein the representative measure is a latest transmission power used by the WCD.

6. The method of claim 1, wherein making the determination of how often to engage in background communications with the RAN comprises determining how long to wait after a given background communication before engaging in a next background communication.

7. The method of claim 1, wherein the background communications comprise application synchronization transactions.

8. The method of claim 7, wherein the application synchronization transactions comprises synchronizations of data selected from the group consisting of e-mail data, calendar data, weather data, news data, gaming data, presence data, and content-catalog data.

9. The method of claim 1, wherein the WCD is selected from the group consisting of a cellular telephone and a tablet computer.

10. The method of claim 1, wherein as the WCD moves more quickly, the WCD gives less weight to the history of the transmission power in deciding how often to engage in the background communications.

11. The method of claim 1, wherein the WCD is in a vehicle, and wherein making the determination based on speed of movement of the WCD comprises making the determination based on speed of movement of the vehicle.

12. The method of claim 11, wherein as the vehicle moves more quickly, the WCD gives less weight to the history of the transmission power in deciding how often to engage in the background communications.

13. The method of claim 1, wherein the WCD making a determination comprises the WCD making the determination autonomously and without basing the determination on load information from the RAN.

14. The method of claim 1, wherein the WCD making the determination comprises the WCD making the determination autonomously and without regard to data transmission rate used by the WCD.

15. A wireless communication device (WCD) comprising:
   a wireless transceiver module for wirelessly transmitting communications to a radio access network (RAN), wherein the WCD engages in a power control process to adjust transmission power used by the wireless transmission module for the transmitting; and
   a processing unit arranged to engage in background communications via the wireless transceiver module and the RAN, wherein the WCD makes a determination, based on a history of the transmission power and based on speed of movement of the WCD, of how often to engage in the background communications, and wherein the processing unit engages in the background communications in accordance with the determination.

16. The WCD of claim 15, wherein the background communications comprise application synchronization transactions.

17. The WCD of claim 15, wherein the application synchronization transactions comprise synchronizations of data selected from the group consisting e-mail data, calendar data, weather data, news data, gaming data, presence data, and content-catalog data.

18. The WCD of claim 15, wherein the WCD makes the determination by determining a representative measure of transmission power history and deciding how often based on the representative measure.

19. The WCD of claim 18, wherein the decision of how often is inversely proportional to the representative measure.

20. The WCD of claim 19, wherein the representative measure is an average.

21. The WCD of claim 19, wherein the representative measure is a latest transmission power used by the WCD.

22. The WCD of claim 15, wherein making the determination of how often to engage in background communications via the RAN comprises determining how long to wait after a given background communication before engaging in a next background communication.

23. The WCD of claim 15, wherein the WCD is in a vehicle, and wherein making the determination based on speed of movement of the WCD comprises making the determination based on speed of movement of the vehicle.

* * * * *